US006912648B2

United States Patent
Hammarlund et al.

(10) Patent No.: US 6,912,648 B2
(45) Date of Patent: Jun. 28, 2005

(54) STICK AND SPOKE REPLAY WITH SELECTABLE DELAYS

(75) Inventors: Per Hammarlund, Hillsboro, OR (US); Stephan Jourdan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 485 days.

(21) Appl. No.: 10/039,598

(22) Filed: Dec. 31, 2001

(65) Prior Publication Data

US 2003/0126406 A1 Jul. 3, 2003

(51) Int. Cl.7 .................................................. G09F 9/30
(52) U.S. Cl. .................................................... 712/219
(58) Field of Search .................................. 712/200, 219

(56) References Cited

U.S. PATENT DOCUMENTS

| | | | | |
|---|---|---|---|---|
| 5,553,267 A | * | 9/1996 | Herlihy | 711/147 |
| 6,094,717 A | * | 7/2000 | Merchant et al. | 712/32 |
| 6,098,166 A | * | 8/2000 | Leibholz et al. | 712/216 |
| 6,163,838 A | * | 12/2000 | Merchant et al. | 712/219 |
| 6,427,193 B1 | * | 7/2002 | Hughes et al. | 711/146 |
| 6,622,235 B1 | * | 9/2003 | Keller et al. | 712/23 |
| 6,665,792 B1 | * | 12/2003 | Merchant et al. | 712/219 |

OTHER PUBLICATIONS

The Authoritative Dictionary of IEEE Standard Terms, 7th Ed., 2000, p. 716.*

* cited by examiner

Primary Examiner—Eddie Chan
Assistant Examiner—Aimee Li
(74) Attorney, Agent, or Firm—Ami Patel Shah

(57) ABSTRACT

A method for stick and spoke replay in a processor. The method of one embodiment comprises dispatching an instruction for execution. The instruction is speculatively executed. It is determined whether the instruction executed correctly. The instruction is routed to a replay mechanism if the instruction did not execute correctly. It is determined incorrect execution of the instruction is due to a long latency operation. The instruction is routed for immediate re-execution if the incorrect execution is not due to the long latency operation. The routing of the instruction for re-execution is delayed if the incorrect execution is due to the long latency operation. The instruction is re-executed if the instruction did not execute correctly. The instruction is retired if the instruction executed correctly.

14 Claims, 7 Drawing Sheets

STICK AND SPOKE REPLAY WITH SELECTABLE DELAYS

FIELD OF THE INVENTION

The present invention relates generally to the field of microprocessors and computer systems. More particularly, the present invention relates to a method and apparatus for a stick and spoke replay system for microprocessors.

BACKGROUND OF THE INVENTION

Microprocessors are the brains behind computers and many other types of machines. The demand for faster processors continually outstrip present technology. The demand pressures all aspects of processor architecture to become faster. New generations of processor are now operating at frequencies that make almost any time delay a significant design constraint. As technology evolves, engineers strive to improve upon the performance of processors through the application various techniques to the architecture. One characteristic of a processor architecture is whether it executes instructions sequentially or out of order. An out of order architecture executes instructions in an order different from that in which the code was originally presented to the processor. With an out of order processor, executions units with the processor that otherwise may be idle can be more efficiently utilized. The sequential nature of software code creates data dependencies. A data dependency exists where a later instruction manipulates an operand X and the data at operand X is a result of an earlier instruction. Thus the later instruction has a data dependency on the operand of the earlier instruction.

Another characteristic of a processor architecture is whether instruction processing is pipelined. The processor fetches instructions from memory and sends them into one end of the pipeline in pipelined processing. The pipeline comprises of several stages, each of which perform some function necessary to process the instruction before the instruction proceeds to the next stage. Each stage moves the instruction closer to completion. A pipeline enables the processor to process more than one instruction at a time, thus increasing the instruction processing rate. Dependent instructions can cause a delay in the pipeline because processors typically do not schedule a dependent instruction until the instruction on which the dependent instruction depends has produced the correct result. But some pipelines process instructions speculatively. Speculative execution is where instructions are fetched and executed before pertinent data dependencies are known to be resolved. During speculative execution, the processor predicts how dependencies will be resolved and executes instructions based on the predictions. For example, the processor may predict that all load instructions hit in the cache, and schedule all depending instructions based on the cache hit latency. This form of speculative execution is called data dependency speculation. The processor then verifies that the execution and predictions were correct before retiring the instruction and the results. Speculative execution can also involve predicting what instructions are needed depending on whether a branch is taken. This form of speculation is called control speculation. For example, if two instructions are to be alternatively executed depending on the value of some quantity, then the pipeline has to predict what that value will be or which execution will be executed. The processor then predicts the next instruction to be executed and fetches the predicted instruction before the previous instruction is actually executed.

The verification step can be a challenge. At the end of the pipeline, the results are temporarily stored until all the dependencies have been resolved. The processor then checks for data dependence violations, mispredictions, or exceptions. If there are no execution problems, the instructions are retired and the results committed to the architectural state. But if problems exist, the processor has to perform a correction routine. Existing techniques for handling exceptions in pipeline processing can substantially reduce instruction throughput.

Some processors use a replay mechanism that reintroduces instructions for execution if they have not executed correctly. FIG. 1 is a block diagram of prior art processor 100 having a replay architecture. The processor 100 includes a scheduler 102 coupled to a multiplexor 104 to provide instructions received from an instruction cache to an execution unit 106 for execution. The execution unit 106 may perform data speculation in executing the various instructions received from the multiplexor 104. Processor 100 includes checker units 108, 110, to send a copy of an executed instruction back to the execution unit 106 for re-execution (replay) if the data dependence and other execution speculation is erroneous. Presently, the replay loops have had fixed latency. Processor 100 also includes a replay queue 120 for queuing instructions for replay. Micro-operations (also referred as micro-ops or uops) are taken out of the replay queue after a dynamically decided time delay, for example when needed data is returned from a memory system. When an instruction has executed correctly, the instruction is retired at the retirement unit 112 and the results applied to the architectural state.

Before the present invention, the uops were introduced to the execution unit through the scheduler. The scheduler predicted the dependencies and using the execution latencies of the uops and the fact that some uops replay and stop the scheduler from issuing a new uop in that time slot, the scheduler issued the uops to execution. The uops would keep the relative spacing decided by the scheduler even when they replayed. Since the spacing was decided on predictions and resource availability (e.g., a replay loop time slot) the schedule might not be optimal.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

Figure 1:
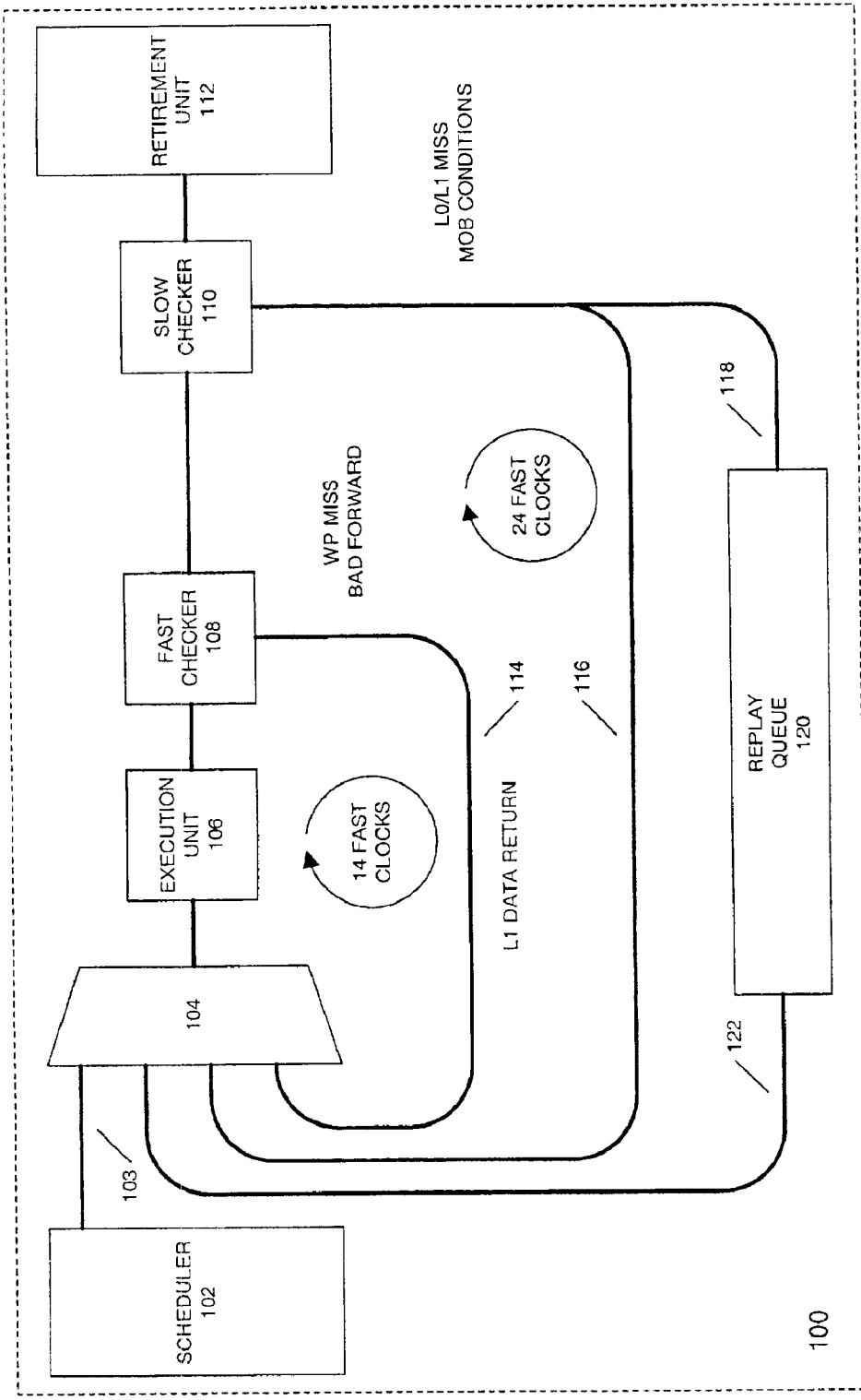
FIG. 1 is block diagram of a prior art processor having a replay architecture.

A method and apparatus for a stick and spoke replay system is disclosed. The embodiments described herein are described in the context of a microprocessor, but are not so limited. Although the following embodiments are described with reference to a processor, other embodiments are applicable to other integrated circuits or logic devices. The same techniques and teachings of the present invention can easily be applied to other types of circuits or semiconductor devices that can benefit from higher pipeline throughput and improved performance. The teachings of the present invention are applicable to any processor or machine that performs data dependence, control, or resource availability speculation in executing instructions. However, the present invention is not limited to processors or machines that perform such speculation and can be applied to any processor and machine in which a replay mechanism is used.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention.

A processor pipeline includes various processing stages. Beginning with a fetch stage, instructions are retrieved and fed into the pipeline. The instructions retrieved at the fetch stage are then input into a decode stage where the instructions are decoded into micro-operations, also referred as micro-ops or uops, for execution by the processor. At an allocate stage, processor resources necessary for the execution of the micro-ops are allocated. The next stage in the pipeline is a rename stage where references to external (logical) registers are converted into internal (physical) register references to eliminate false dependencies caused by register reuse. At a schedule/dispatch stage, each micro-op is scheduled and dispatched to an execution unit. The micro-ops are then executed at an execute stage. After execution, the micro-ops are retired at a retire stage.

These processing stages can be organized into three phases. The first phase, referred to as an in-order front end phase, includes the fetch, decode, allocate, and rename stages. During the in order front end phase, the instructions proceed through the pipeline in their original program order. The second phase can be referred to as the out of order execution phase or back end phase including the schedule/dispatch stage and the execute stage. During this phase, each instruction may be scheduled, dispatched, and executed as soon as its data dependencies are resolved and the appropriate execution unit is available, regardless of its sequential position in the original program. The third phase, referred to as the in order retirement phase, includes the retire stage. In this phase, the instructions are retired in their original, sequential program order to preserve the integrity and semantics of the program.

The back end phase makes predictions that speculatively resolve dependencies needed to execute the micro-ops. After the execution, the micro-ops and results are temporarily stored to await commitment to an architectural state. Committing to the architectural state includes checking whether any problems occurred and whether the predictions were correct. If a problem or incorrect problem is discovered, the speculative execution results are squashed or ignored. The back end of the pipeline is then flushed or drained. The pipeline may also be reset.

An instruction can execute incorrectly for many reasons. The most common reasons are a source data dependency, execution unit conflict, or an external replay condition. A source data dependency can occur when an instruction source is dependent on the result of another instruction. Data speculation may involve speculating that data from the execution of an instruction on which the present instruction is dependent will be stored in a location in cache memory, i.e. cache hit. Data speculation can also involve speculating that data retrieved from a cache memory is valid. The processor proceeds on the assumption that data retrieved from memory is good. However, when the data is invalid, the results of the execution of the speculatively executed instructions are disregarded and the processor backs up to replay the instructions that were executed. Problems can include: (1) a cache miss; (2) a branch or predicate misprediction; (3) an internal exception such as a page fault or an illegal instruction; (4) a translation look-aside buffer (TLB) miss; (5) execution hardware conflicts; and (6) data dependencies such as load/store conflicts and any other conflict.

Replay is the re-execution of instructions upon detecting an exception. If an exception is detected, speculative results are ignored. The architectural state is not updated and instructions are not retired. Execution problems can result in: (1) executing an instruction that should not have been executed; (2) not executing an instruction that should have been executed; or (3) executing an instruction with incorrect data. In order to process the instruction stream correctly, the effects of execution problems on subsequently executed instructions must also be corrected. The processor corrects the problem and replays the affected instructions.

If the data speculation is erroneous, the instruction is replayed by the execution unit until the correct result is obtained. For this embodiment, a fast checker is responsible for sending a copy of an instruction back to the execution unit for replay if an early error is detected with respect to the execution of the instruction. A slow checker is responsible for sending a copy of an instruction back to the execution unit for replay if a late error is detected with respect to the execution of the instruction. A selector is used to provide either a subsequent input instruction, a copy of the incorrectly executed instruction from the fast checker, or a copy of the incorrectly executed instruction from the slow checker to the execution unit for execution, based upon a predetermined priority scheme. It is desirable to limit the amount of replay because each replayed micro-op uses up available resources and degrades the overall system performance. But in general, replay provides a positive gain in net performance. Since the scheduler cannot schedule instruction when there is a uop that is replaying, a uop may be scheduler later than optimal. As the conflicting uops retire, some rearrangement of the uops' positions in the replay loop is beneficial.

The present invention introduces a stick and spoke replay mechanism with selectable delays. If the reason why an instruction needs to be replayed can be identified, then it may be possible to associate the instruction with a desired change in replay loop position. Thus the replay of the instruction with a changed replay slot is likely to result in the successful re-execution of the instruction. For example, if a load operation results in a cache miss, the load instruction can execute a first time without returning the requested data. Upon detecting the load miss, the load instruction and its dependents will be placed in a replay queue for replay at a later time. If the processor can decide that the L1 cache read requires M number of clock cycles to return data, then the load operation and dependents can be remain in the queue where the load operation will not replay before M number of cycles.

Embodiments of a stick and spoke replay mechanism can identify the cause of an execution problem in the error checker. Depending on what class of execution problem the error fits into, an appropriate delay can be associated with the instruction. The instruction is inserted into a corresponding advance/delay queue for replay or rescheduling. A stick and spoke replay mechanism can reduce replay tornadoes by avoiding unnecessarily replaying instructions that cannot be executed correctly in the replay slot the are in. This replay mechanism attempts to improve the performance by shifting the time for replaying an instruction. Instead of an instruction looping around a number of times with a fixed replay latency, an instruction is replayed with a change in replay loop latency for a greater chance of success. The time shift placed on each instruction is dependent on the type of instruction and is computed on a case by case basis in one embodiment. In one implementation, the advance/delay applied to an instruction can be computed dynamically and based off a time estimate from the memory system or type of execution unit conflict. The time delay applied to a given instruction can also depend on what is currently in the replay queue and an external event triggered the replay. In another design, the replay mechanism can dynamically shift the instruction by one clock cycle or one position each time the instruction is replayed again. Power savings can also be achieved as such instructions are replayed less frequency. Certain deadlock conditions may also be avoided with a stick and spoke replay mechanism.

Figure 2:
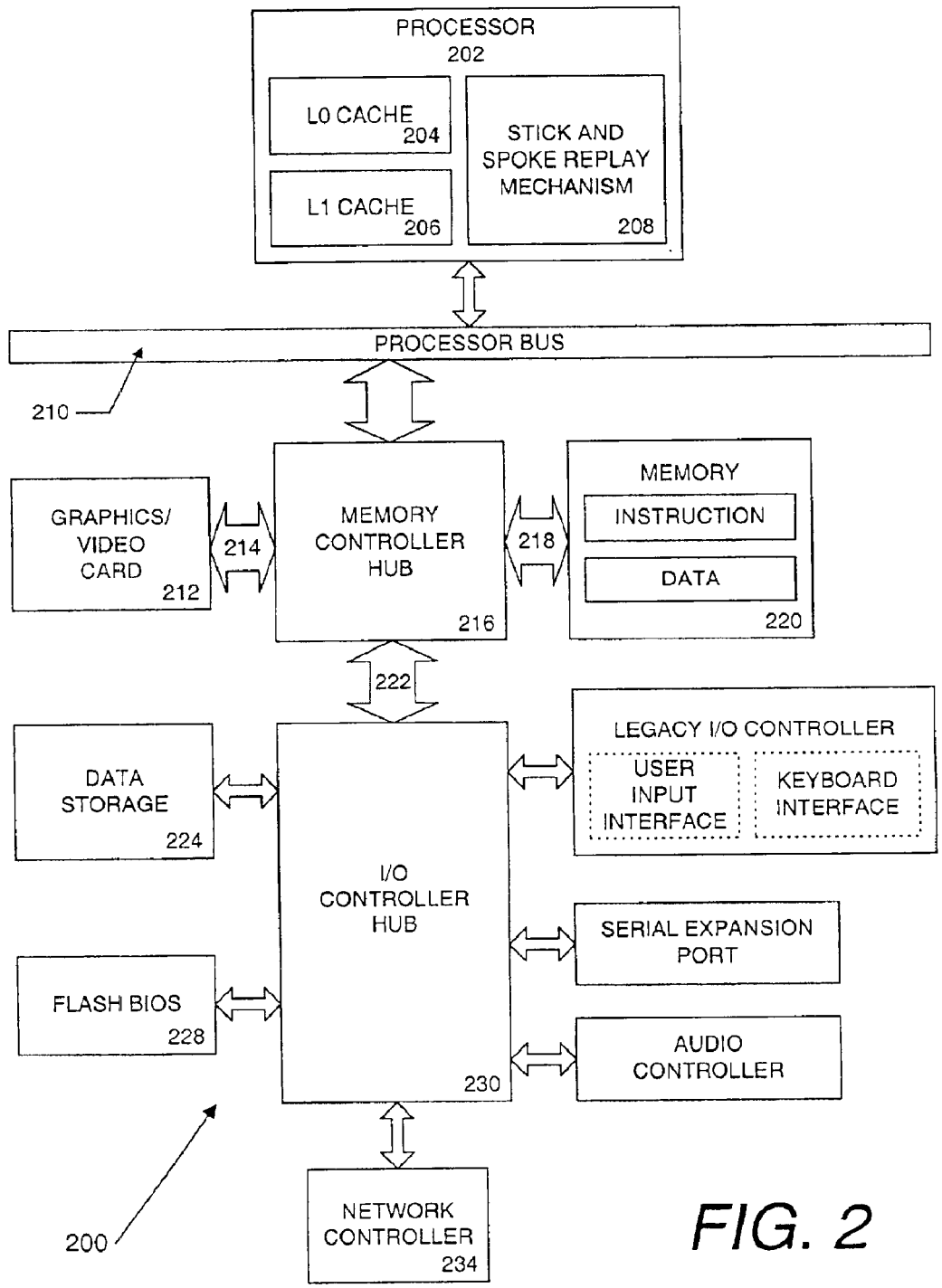
FIG. 2 is a block diagram of a computer system formed with a processor that includes a stick and spoke replay system in accordance with the present invention.

Referring now to FIG. 2, an exemplary computer system 200 is shown. System 200 includes a component, such as a processor 202, employing a stick and spoke replay mechanism 208 in accordance with the present invention, such as in the embodiment described herein. The processor 202 of this embodiment speculatively schedules instructions and that includes a replay system 208. The replay system 208 replays instructions that were not executed correctly when they were initially dispatched to an execution unit while preserving the originally scheduled order of the instructions. An instruction is considered not successfully executed when the instruction is executed with bad data, or an instruction whose output are bad due to a cache miss, etc.

System 200 is representative of processing systems based on the PENTIUM® III, PENTIUM® 4, Itanium™ microprocessors available from Intel Corporation of Santa Clara, Calif., although other systems (including PCs having other microprocessors, engineering workstations, set-top boxes and the like) may also be used. In one embodiment, system 200 may be executing a version of the WINDOWS™ operating system available from Microsoft Corporation of Redmond, Wash., although other operating systems and graphical user interfaces may also be used. Thus, the present invention is not limited to any specific combination of hardware circuitry and software.

The present enhancement is not limited to computer systems. Alternative embodiments of the present invention can be used in other devices such as, for example, handheld devices and embedded applications. Some examples of handheld devices include cellular phones, Internet Protocol devices, digital cameras, personal digital assistants (PDAs), and handheld PCs. Embedded applications can include a microcontroller, a digital signal processor (DSP), system on a chip, network computers (NetPC), set-top boxes, network hubs, wide area network (WAN) switches, or any other system which use a mechanism for minimizing power dissipation for other embodiments.

FIG. 2 is a block diagram of a computer system 200 formed with a processor 202 that includes a stick and spoke replay system 208 in accordance with the present invention. The present embodiment is described in the context of a single processor desktop or server system, but alternative embodiments can included in a multiprocessor system. System 200 is an example of a hub architecture. The computer system 200 includes a processor 202 that processes data signals. The processor 202 can be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. FIG. 2 shows an embodiment of the present invention implemented in a single processor system 200. However, it is understood that other embodiments may alternatively be implemented in multiprocessor systems. The processor 202 is coupled to a processor bus 210 that transmits data signals between the processor 202 and other components in the system 200. The elements of system 200 perform their conventional functions well known in the art.

In one embodiment, the processor 202 includes a Level 0 (L0) internal cache memory 204 and a Level 1 (L1) internal cache memory 206. Depending on the architecture, the processor 202 can have a single internal cache or multiple levels of internal cache. Alternatively, in another embodiment, the cache memory can reside external to the processor 202. A stick and spoke replay mechanism 208 also resides in the processor 202. Alternate embodiments of an stick and spoke mechanism 208 can also be used in microcontrollers, embedded processors, graphics devices, DSPs, and other types of logic circuits. System 200 includes a memory 220. Memory 220 can be a dynamic random access memory (DRAM) device, a static random access memory (SRAM) device, flash memory, or other memory device. Memory 220 can store instructions and data that can be executed by the processor 202.

A system logic chip 216 is coupled to the processor bus 210 and memory 220. The system logic chip 216 in the illustrated embodiment is a memory controller hub (MCH). The processor 202 communicates to the MCH 216 via a processor bus 210. The MCH 216 provides a high bandwidth memory path 218 to memory 220 for instruction and data storage and for storage of graphics commands, data and textures. The MCH 216 directs data signals between the processor 202, memory 220, and other components in the system 200 and bridges the data signals between processor bus 210, memory 220, and system I/O 222. In some embodiments, the system logic chip 216 provides a graphics port for coupling to a graphics controller 212. The MCH 216 is coupled to memory 220 through a memory interface 218. The graphics card 212 is coupled to the MCH 216 through an Accelerated Graphics Port (AGP) interconnect 214.

System 200 uses a proprietary hub interface bus 222 to couple the MCH 216 to the I/O controller hub (ICH) 230. The ICH 230 provides direct connections to some I/O devices. Some examples are the audio controller, firmware hub (flash BIOS) 228, data storage 224, legacy I/O controller containing user input and keyboard interfaces, a serial expansion port such as Universal Serial Bus (USB), and a network controller 234. The data storage device 224 can comprise a hard disk drive, a floppy disk drive, a CD-ROM device, a flash memory device, or other mass storage device.

For another embodiment of a system, a stick and spoke replay mechanism can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 3:
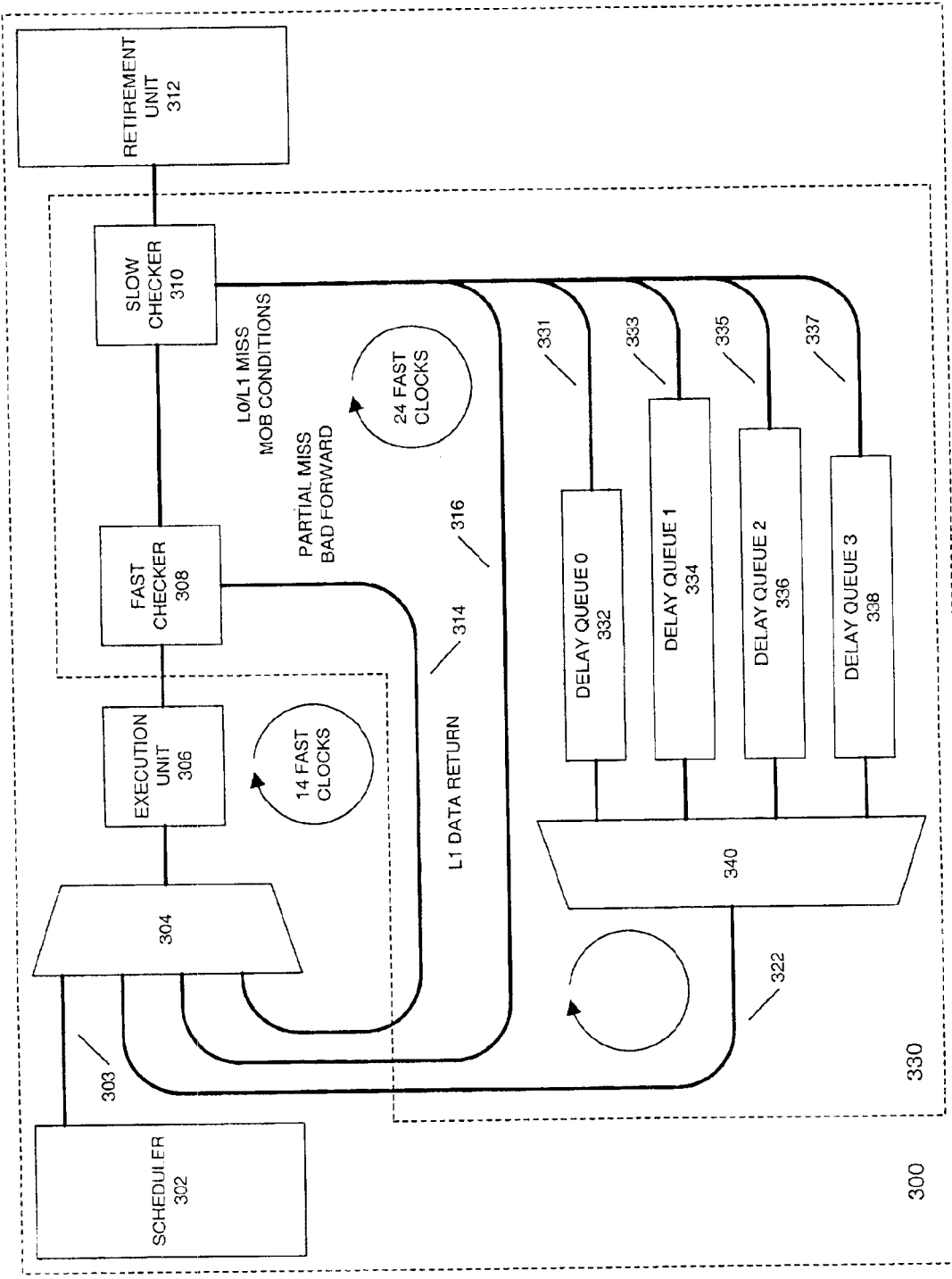
FIG. 3 is a block diagram of a processor including a stick and spoke replay mechanism in accordance with one embodiment of the present invention.

FIG. 3 is a block diagram of a processor including a stick and spoke replay mechanism in accordance with one embodiment of the present invention. The front end of the processing phase is coupled to the scheduler 302. Instructions are dispatched speculatively. Thus the scheduler 302 can dispatch an instruction without first determining whether data needed by the instruction is valid or available. Scheduler 302 dispatches instructions from the front end when it predicts resources are available to execute the instructions. The scheduler 302 normally send out a continuous stream of instructions on line 303 to the execution unit 306 via a multiplexor 304. But the scheduler 302 can detect by its own logic and from control signals when an instructions should not be dispatched. Upon such detection, the scheduler 302 does not dispatch an instruction in the next clock cycle. When an instruction is not dispatched, a hole is formed in the instruction stream and another device can insert an instruction into the hole. The scheduler 302 can also re-order the instructions to execute the instructions out of program order to achieve efficiencies inherent with data speculation. For one embodiment, a counter is used to track the number of times each instruction has been executed or replayed. The execution count can be used to avoid excessive replay looping, which can decrease processor throughput and increase power consumption.

Processor 300 also includes a replay mechanism 330. The replay system 330 replays instructions that were not executed correctly after they were scheduled by the scheduler 302. Thus instructions, regardless of the type of instruction or the specific circumstances under which they failed to execute properly can be routed back to the multiplexor 304 via the replay mechanism for replay. The processor 300 of this embodiment has multiple replay paths to facilitate data speculation in executing instructions. The first path 314 is a fast or early replay path. The second path 316 is a slow or late replay path. The first and second path can be useful for short latency instructions which will typically require only one or a small number of passes or iterations through those replay loops. In addition, this processor 300 includes a set of four paths 332, 334, 336, 338, having various advance/delay periods. An advance queue allows a uop to execute in an earlier slot and a delay queue allows a uop to execute in a later slot. It will be appreciated that the present invention can be implemented in a variety of ways to accomplish the desired results. For example, a single queue or buffer can be accessed at various depths for insertion or an instruction can be marked with a time dependency for re-execution. These delay queues 332, 334, 336, 338, are for the longer latency re-executions on a cache miss. A scheduler 302 is coupled to an instruction cache and dispatches instructions from the instruction cache to an execution unit 306 via a multiplexor 304. The execution unit 306 performs data speculation in executing an instruction. Execution unit 306 can be an arithmetic logic unit (ALU), a floating point ALU, a memory unit, etc. Although the example of FIG. 3 shows one execution unit 306 in order to simply the description, multiple execution units can be coupled to multiple schedulers. In an embodiment with multiple schedulers, multiple loops may be executing concurrently.

In this replay architecture, two checker units 308, 310, are positioned after the execution core 306. The checkers 308, 310, can analyze the data dependency of the instruction and whether any error exists. Furthermore, the checker also checks the condition of the result of the execution to determine whether replay is necessary. If an instruction has executed successfully, the checkers 308, 310, mark the instruction as completed and declares the instruction "replay safe". The positioning of the fast (early) checker 308 and the slow (late) checker 310, permit the detection of incorrect instruction execution at different points. One reason for having both fast checker 308 and slow checker 310 is because the external replay conditions generated by execution unit 306 are generated at different stages in the pipeline. For instance, there are cases in which certain errors and conditions can be detected earlier which indicates that data speculation in these cases is erroneous even before the TLB logic and the hit/miss logic are executed. With a fast checker, the respective instructions that were executed incorrectly due to erroneous data speculation or early errors could be sent back to the execution core for re-execution or replay sooner. The slower checker 310 can catch problems that arise later in the pipeline.

A first fast checker 308 detects a first type of errors. A second slow checker 310 detects a second type of errors. For this embodiment, the errors detectable by the slow checker 310 arise within a time period longer than that for the fast checker 308. Thus if the fast checker 308 detects an error, the incorrectly executed instruction allows the incorrectly executed instruction to be replayed much faster than it would have been if the instruction had to wait until the slow checker 310 detected an error. The fast checker 308 can send the respective instruction back to the execution unit 306 via multiplexor 304 if the instruction is erroneous. The fast path 314 of this embodiment is 14 clock cycles long. Similarly, the slow checker 310 can send an instruction back to the execution unit 306 via multiplexor 304 if the slow checker 310 detects that the data speculation is erroneous or that other error conditions exist. The slow path 316 of this embodiment is 24 clocks long. However, the actual latencies of the loops vary depending on the particular implementation and should not be viewed as restrictive in any sense.

The replay mechanism of this embodiment enables the change of replay loop latency of certain instructions. These certain instructions are those that can be identified and the condition causing the instruction execution error has an approximate completion time. In the L0 cache miss and L1 cache read example describe above, the L1 cache read requires a minimum M clock cycles to complete. Thus the load operation can be placed in the delay queue of this embodiment that meets the M cycle delay. The load operation is released from the delay queue back to the execution unit for re-execution after M cycles has passed. For this embodiment, the multiplexor 304 manages propagation of instructions from the scheduler 302 and all the replay loops (i.e. the fast replay loop 314, the slow replay loop 316, and the advance/delay queues 332, 334, 336, 338). Thus the instructions from the replay mechanism can be sent directly to the execution unit 306 via the multiplexor 304 without being rescheduled by the scheduler 302.

The advance/delay queues 332, 334, 336, 338, of one embodiment can be configured to handle specific types of instructions. It should be understood that the replay loops 314 and 316 can also have advance/delay units. For example, instructions having an opportunity to move ahead can be sent to the advance queue, instructions having source dependency errors may be sent to a first queue such as delay queue 0 332. A L0 cache miss/L1 cache hit can be sent to delay queue 1 334. Delay queue 2 336 can handle longer delay instructions such as a L0 cache miss/L1 cache miss that requires an external memory access. Delay queue 3 338 can be configured to take instructions such as a DRAM access that requires a extremely long period of time to remedy. Examples of other types of instructions destined for the advance/delay queues 332, 334, 336, 338, can include jump instructions, branch instructions, segment conflicts, depipelined instructions, multiply/divide collisions, and sidedoor instructions.

The multiplexor 304 of this embodiment is configured to receive instructions from the scheduler 302, the fast checker 308, the slow checker 310, and the advance/delay queues 332, 334, 336, 338. The slow checker 310 provides instructions to the advance/delay queues 332, 334, 336, 338. The multiplexor 304 performs its function based upon the selection signals received from the fast checker 310, slow checker 310, and the delay queues 332, 334, 336, 338. For one embodiment, the multiplexor 304 can also be controlled by another select signal from a memory control unit that generates a manufactured instruction that is not in the instruction flow. These various select signals are used by the multiplexor 304 to determine which instruction is to be sent to the execution unit 306 for execution in a given processing cycle if there are more than one instruction from different paths 303, 314, 316, 322, waiting to be executed. An arbitration algorithm can also be used to determine which of these instruction paths 303, 314, 316, 322, should be selected by the multiplexor 304 when instructions are provided on more than one path.

Other conditions can also generate replays. For example, if two different instructions need the same execution hardware resource at that same time, one of the instructions may need to be replayed as both instructions cannot access the resource simultaneously. One advantage of this arrangement is that the fast checker is able to replay some instructions as quickly as possible based on earlier generated replay conditions. The performance of the processor 300 improves because instructions are replayed more quickly. By ensuring that slow checker 310 receives a superset of all external replay conditions, the replay system 330 is designed to catch any operation that has executed incorrectly at the slow checker 310 and replay the instruction. For this embodiment, any escapes from the fast checker 308 will be caught at the slow checker 310. The checkers 308, 310, are also coupled to a scoreboard that indicates which registers have valid data. By using a scoreboard, the checkers 308, 310, can determine that an instruction has not executed correctly because the data in the required register is not valid. The slow checker 310 is coupled to the retirement unit 312.

The scheduler 302 and the execution unit 306 assume that everything is okay. The checkers 308, 310, and retirement unit 312 check for problems. Three basic conditions are generally checked. One condition checked is data dependency. This check ensures that all input data dependencies were met at execution. A second condition checked involved external replay requests. This check determines whether any agent has requested that an instruction be replayed. A third condition involves bogus instructions. A check is made for speculative instructions that follow the detection of a mispredicted branch and have been passed on for retirement.

If a problem is discovered, the checkers 308, 310, and retirement unit 312 can request the replay mechanism to replay the instruction until the problem goes away. In one embodiment, instructions may be first replayed in a fast replay loop or a slow replay loop. Unfortunately, some instructions are replayed over and over again, resulting in replay tornadoes where the same instructions go round and round in the replay circuit. If the problem persists and progress towards resolution is not being made, the replay control logic will cause the instructions to be placed into the replay queue. The replay queue is used to break up tornadoes, deadlock conditions, and live lock conditions.

Instructions can also be routed by a controller for temporary storage in a replay queue prior to replay. A controller controls when the instructions stored in the replay queue are unloaded. The replay queue of this embodiment includes a advance/delay queue 0 332, delay queue 1 334, delay queue 2 336, delay queue 3 338, and a replay queue multiplexor 340. The delay queues 334, 336, 338, 340, each have different advance/delay periods and each can hold a number of instructions. Thus as instructions are sent to the delay queues for holding prior to replay, the instructions can be stored for different time periods. The queue multiplexor 340 controls which replay queue instruction is sent to the multiplexor 304 for execution. The instructions outputted from the replay multiplexor 340 are coupled to the multiplexor 304 via line 322. The expectation is that the long latency instruction and its dependents will now properly execute after waiting for a delay period in one of the delay queues.

The replay queue arrangement of this embodiment can be advantageous because execution resources are not wasted on instructions that have no hope of executing properly at the moment. This configuration allows for prudent and efficient use of execution resources. Furthermore, power savings can be achieved by not executing long latency instructions before the necessary data is available. The overall latency of the program can also be reduced as independent instructions are permitted to execute in parallel while the data is being generated by long latency instructions. Instructions having different and unknown latencies can be accommodated in the replay queue and can be executed upon the data whenever that occurs.

The retirement hardware 312 of this embodiment includes retirement logic, a speculative register file, an architectural register file, and a mask. The results from executed instructions are temporarily stored in the speculative register file. The retirement logic determines whether any execution problems occurred during the execution of the instructions corresponding to execution results stored in the speculative register file. If the retirement logic determines that no execution problems occurred, the retirement logic writes the execution results from the speculative register file to the architectural register file and retires the instruction. Retiring instructions is beneficial to the processor 300 because processor resources can be freed up and additional instructions can start execution. If the retirement logic determines that a problem occurred, the retirement logic institutes a backend replay instead of writing the results to the architectural register file. The replay point may be the replay queue. The pipeline replays the instructions which encountered execution problems by dispatching the relevant instructions from the queue to the execution units.

According to one embodiment, a long latency instruction is identified and loaded into the replay queue. Preferably, all instructions that are dependent upon the long latency instruction should also be placed in the replay queue because these instructions will also not execute properly until return of the data for the erroneous instruction. When the condition causing the instruction not to complete successfully is cleared, the replay queue is unloaded so that the long latency instruction and the others stored in the replay queue can be re-executed. If it turns out that the source data was not available at the time of execution but that the sources are now valid, checkers determines that the instruction is safe for replay and signals the replay queue that the instruction needs to be replayed. The checkers indicates when that the instruction is replay safe.

The results of the re-execution are temporarily buffered and checked for problems. Although the problem necessitating the replay should not occur, other problems can arise. If a new problem is detected, then another replay is requested. The pipeline will eventually produce a problem free set of results and the instructions can be retired. Each iteration of the backend progresses toward retirement of the instructions.

To determine when instructions should be passed back to the execution unit 304, the replay queue of one embodiment maintains a set of bits for each instruction that is not retired by the checker. The bits can include a replay safe bit, a valid bit, an in-flight bit, and a ready bit. If an instruction executed correctly, the checkers signal the replay queue with a replay safe bit paired with an instruction identifier. The replay queue also marks a replay safe bit as true and clears an in-flight bit for the instruction. If the instruction is incorrect, the replay queue sets the valid bit to true when the instruction has been loaded and is in the replay queue. The replay queue sets the in-flight bit to true when the instruction is being executed in the execution unit 304. The replay queue sets the ready bit to true when the inputs or sources needed for the instruction to execute are known to be ready.

An example of a long latency instruction is a memory load instruction in which there are L0 and L1 cache misses on a first attempt at executing an instruction. As a result, the execution unit has to retrieve the data from an external memory device. This retrieval can be very time consuming, requiring several hundred clock cycles. Any unnecessary and repeated re-execution of this long latency load instruction before its source data has become available wastes valuable execution resources, prevents other instructions from executing, and increases overall processor latency. This embodiment includes a replay queue for storing instructions. After the unsuccessful execution of an instruction, that instruction and its dependent instructions are stored in the replay queue until the data the instruction requires returns. For example, when the data for a memory load instruction returns from external memory, the memory load instruction and its dependent instructions can then be scheduled for execution.

Some long latency instructions may require many iterations through the replay loop before executing successfully. If an instruction did not execute successfully on a first attempt, the replay mechanism may determine whether the instruction requires a relatively long period of time to execute and thus require several replays before executing properly. During this relatively long period of time, it is possible that this instruction can circulate an inordinate number of times. An instruction can loop from the replay queue to the execution unit to the checkers and back again anywhere from a few to hundreds of iterations. But each iteration of the instruction before the needed data is available unnecessarily occupies a slot in the execution pipeline and wastes resources that could have been allocated to other instructions that are ready to execute. Furthermore, there may be many additional instructions that are dependent on the results of this long latency instruction. These dependent instructions would not execute properly either until after the long latency instruction does. Thus these dependent instructions can also repeatedly circulate without executing properly.

The unnecessary and excessive iterations that might occur before the return of needed data may waste execution resources, may waste power, and may increase overall latency. In addition, such iterations may cause a backup of instructions and greatly reduce processor performance in the form of reduced throughput. To prevent this condition, long latency instructions and dependent instructions are kept in the replay queue until the resources and data are available. This is achieved by storing the instructions in the advance/delay queues 332, 334, 336, 338. The instructions can be sent for replay at a later time. When an instruction held in the replay queue is ready for re-execution, the ready bit is set to true and the replay queue releases the instruction and its dependent instructions towards the execution unit 304. Thus long latency instructions will not unnecessarily delay execution of other non-dependent instructions. Performance may be improved and throughput increased. Power consumption may also be decreased as instructions are not executed fruitlessly.

Figure 7:
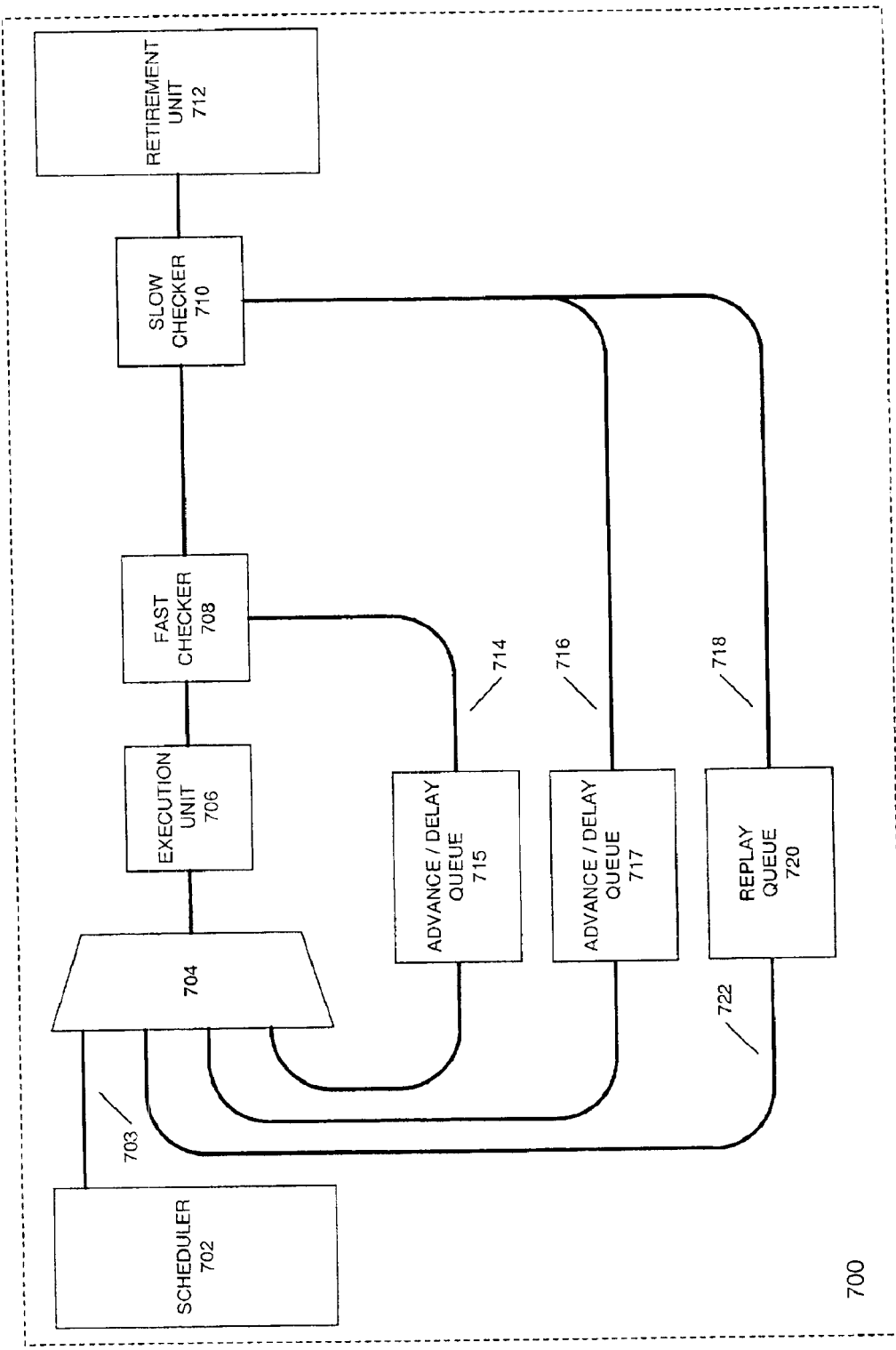
FIG. 7 is a block diagram of a processor including a stick and spoke replay mechanism with advance/delay queues in accordance with another embodiment.

FIG. 7 is a block diagram of a processor including a stick and spoke replay mechanism with advance/delay queues in accordance with another embodiment. The processor 700 includes a scheduler 702 coupled to a multiplexor 704 to provide instructions received from an instruction cache to an execution unit 706 for execution. The execution unit 706 may perform data speculation in executing the various instructions received from the multiplexor 704. Processor 700 includes checker units 708, 710, to send a copy of an executed instruction back to the execution unit 706 for re-execution/replay if the data dependence and other execution speculation is erroneous. When an instruction has executed correctly, the instruction is retired at the retirement unit 712 and the results applied to the architectural state. The processor 700 of this embodiment has multiple replay paths to facilitate data speculation in executing instructions. The first path 714 is a fast or early replay path. The second path 716 is a slow or late replay path. In this replay architecture, two checker units 708, 710, are positioned after the execution unit 706 to detect errors.

Processor 700 also includes a replay queue 720 for queuing instructions for replay. The delay queues of the above example, as is the replay queue unit 720 in this example, are for the longer latency re-executions on cache misses. The latency in a replay loop without an adjustable advance/delay queue is fixed. Thus a replay queue or a replay loop without a advance/delay unit can take an uop out of the loop and out of the execution path, but the uop will be placed back into the loop for execution after an M number of clock cycles. The advance/delay units 715, 717, in the replay loops 714, 716, of this embodiment change the otherwise fixed latency of the replay loops. These advance/delay queues 715, 717, dynamically move the uops. In moving the uops, they can be reintroduced into the instruction stream at optimal points. The small advance/delay units of this embodiment will adapt a uop forward and/or backward in the replay time slots. These advance/delay units 715, 717, can make small changes at certain instances such as opportunistically moving a uop forward when a spot opens up or backwards as resource conflicts are detected as in the case of an execution unit conflict.

The uops can now be introduced to the execution unit 706 through the multiplexor 704 from the advance/delay queues 714, 717. The advance/delay queues 714, 717, evaluate the dependencies and execution latencies of the uops in order to reissue the uops back into the stream for execution in another time slot. The relative spacing of the uops can be changed and is decided by the advance/delay queues 714, 717. The advance/delay queues 714, 717, decides the spacing was based on predictions and resource availability so that the timing may be optimal. A uop is inserted as a slot opens up or if resources come available. The advance/delay queues 714, 717, can shift the timing of the uop insertion to accommodate the timing of openings and conflict resolutions. For example, a set of replaying uops, A, may have caused a uop, B, to be issued later than the execution latency of the uop it is dependent on. As these uops A retire, the uop B can move forward in the replay loop to a slot that more closely matches the execution latency of the uop it is dependent on. Embodiments of the present invention can be used to achieve this movement of uops. Another replay architecture problem is that a group of uops that are scheduled in back-to-back replay time slots need to execute on the same unit and the execution unit can only service uops every other cycle. Embodiments of the present invention can also move the uops to a better spacing so that they are more likely to execute correctly.

Figure 4:
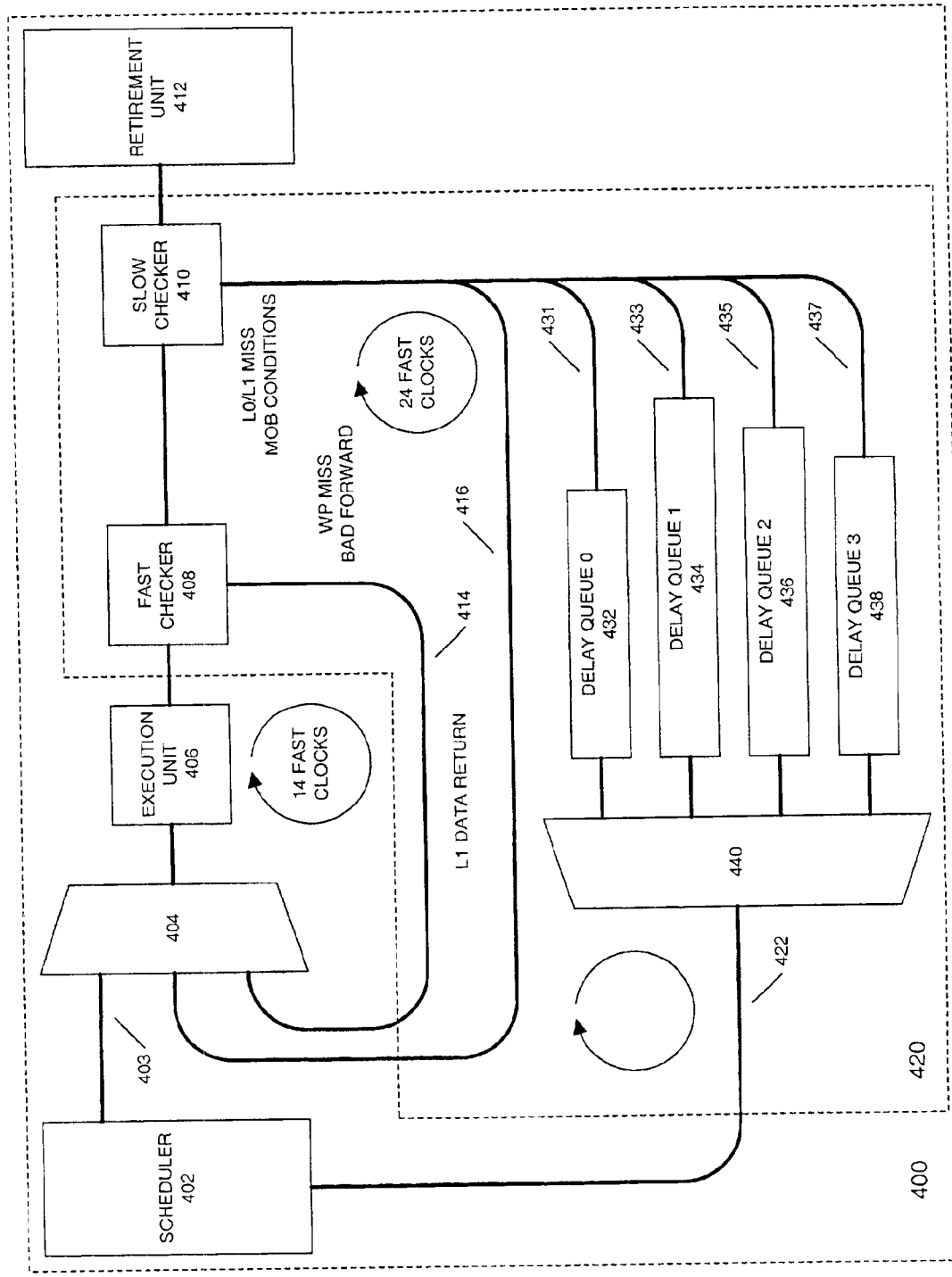
FIG. 4 is a block diagram of a processor including a stick and spoke replay mechanism in accordance with another embodiment of the present invention.

FIG. 4 is a block diagram of a processor including a stick and spoke replay mechanism in accordance with another embodiment of the present invention. A scheduler 402 is coupled to multiplexor 404, which in turn sends instructions to execution unit 406. The execution unit 406 executes instructions and passes the instructions and its results to a fast checker 408 and a slow checker 410. The fast checker 408 is designed to catch early errors and replay the instruction on a fast replay loop 414. The slow checker 410 is designed to catch later errors. The slow checker 410 can replay the instruction on a slow replay loop 416 or send the instruction to one of the delay queues 432, 434, 436, 438. The fast replay loop 414 and the slow replay loop 416 are coupled to multiplexor 404, where the instructions can be sent to the execution unit 406 for re-execution without rescheduling. The checkers can also detect the type of instruction and error that occurred. Depending on the minimum amount of time needed to correct such an error, the replay logic can store the instruction in a delay queue having a sufficient delay period, thus avoiding fruitless replays. The replay logic of this embodiment also tracks the number of times an instruction is executed. This count may be used in subsequent replays to better predict what delay to apply to the instruction and which delay queue to hold the instruction. Retirement unit 412 is coupled to slow checker 410 and retires the instruction and applies the results to the architectural state if no errors.

Each of the queues (delay queue 0 432, delay queue 1 434, delay queue 2 436, and delay queue 3 438) in the replay mechanism can store instructions for delayed replay. Each delay queue is configured to have a different delay period. The delay queues 432, 434, 436, 438, are coupled to a replay queue multiplexor 440 that manages the output of instructions from the delay queues. The multiplexor 440 is coupled to scheduler 402. For this embodiment, the instructions identified for delay replay are rescheduled for re-execution by the scheduler 402 instead of being sent to the execution unit via multiplexor 404. A check is made to determine if the re-execution of the instruction was successful. If the re-execution was not successful, the method continues where the counter for the instruction is incremented. A signal is sent to the replay queue indicating that the execution was unsuccessful and that the instruction should be rescheduled again for re-execution. If execution of the instruction was successful, the instruction is retired. System resources for that instruction can be deallocated and the instruction removed from the replay queue. In one embodiment, a single queue or buffer can be accessed at various depths for insertion or an instruction can be marked with a time dependency for rescheduling.

Figure 5:
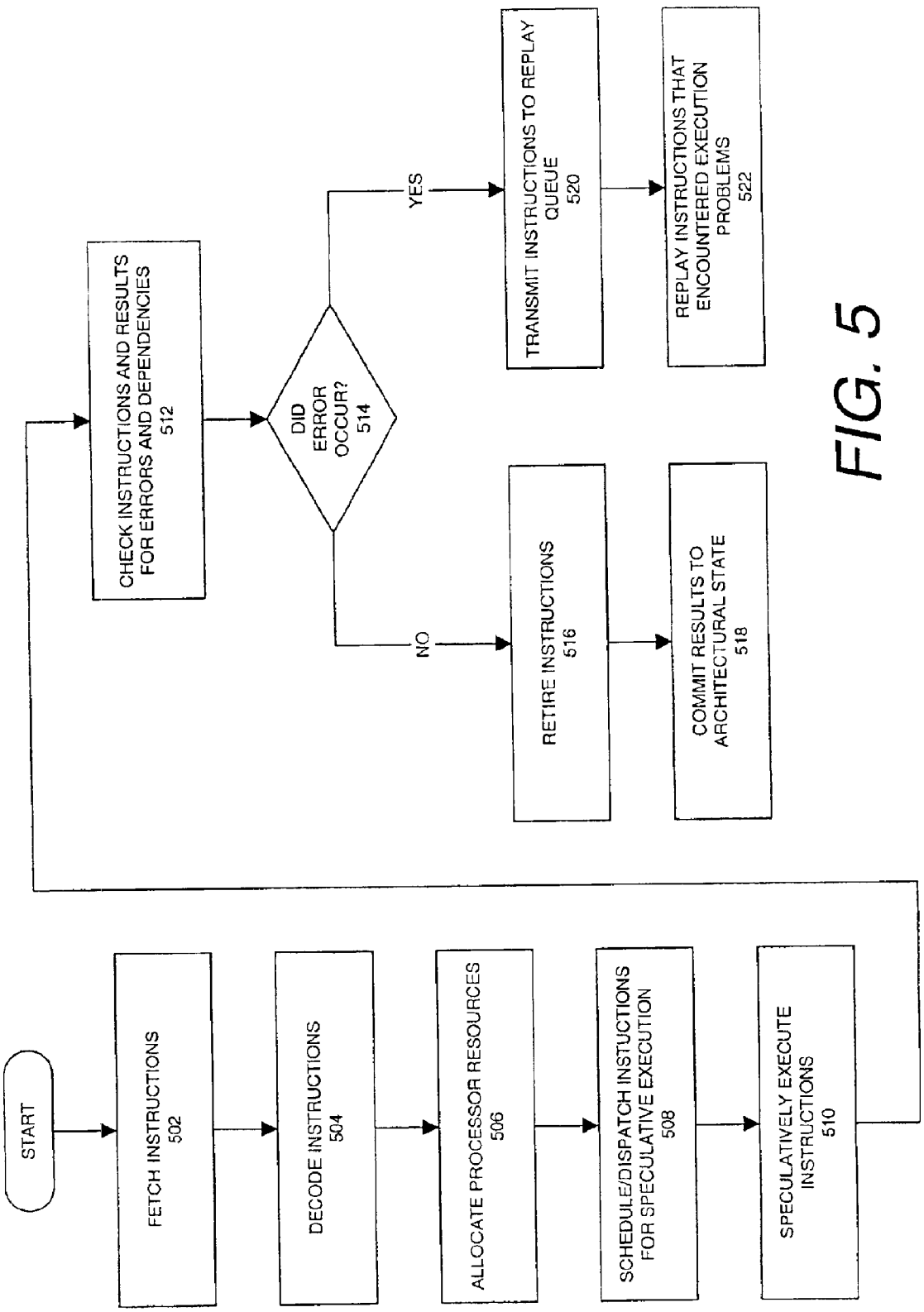
FIG. 5 is a flow chart showing one embodiment of a method in accordance with the present invention for stick and spoke replay in a microprocessor.

FIG. 5 is a flow chart showing one embodiment of a method in accordance with the present invention for stick and spoke replay in a microprocessor. At block 502, the processor pipeline fetches instructions from memory. The instructions are decoded at block 504. The processor then allocates the necessary processor resources at block 506 for each decoded instruction. Each instruction that is ready for execution is scheduled or dispatched for speculative execution at block 508. At block 510, each instruction is speculatively executed. After the instructions are executed, the instructions and results are checked for errors and dependency issues at block 512. At block 514, a determination is made as to whether an error occurred. If no error exists and the instruction executed correctly, the instruction is retired at block 516. The results of that instruction are committed to the architectural state at block 518. But if an error exists, then the instruction is transmitted to the replay queue at block 520. The instructions that encountered execution problems are replayed at block 522.

Figure 6:
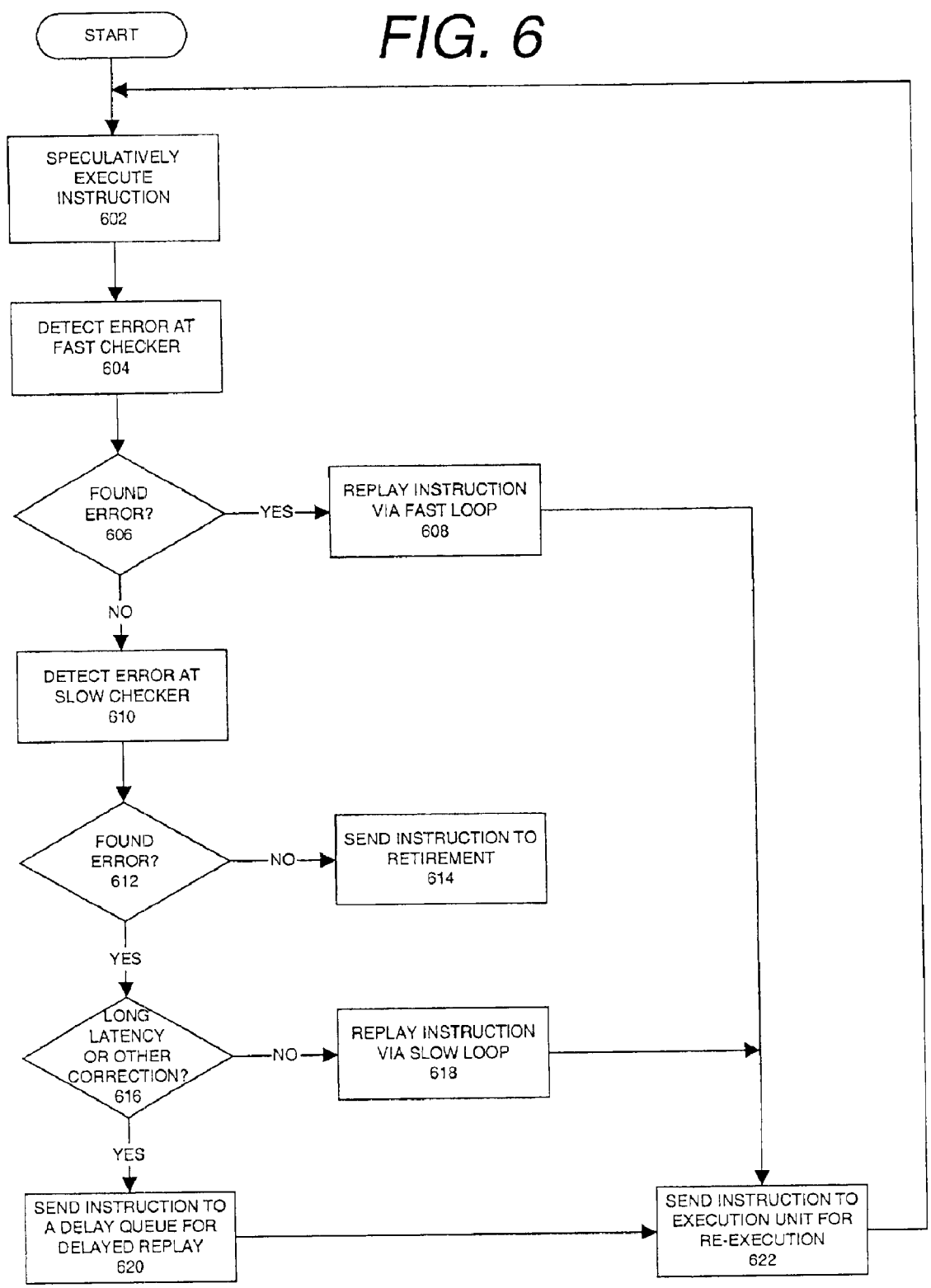
FIG. 6 is a flow chart showing the replay method of one embodiment.

FIG. 6 is a flow chart showing the replay method of one embodiment. At block 602, an instruction is speculatively executed. A fast checker at block 604 detects whether an error exists at that point. For this embodiment, the fast checker checks for a subset of errors. If an error is found at block 606, the instruction is tagged for replay. The incorrectly executed instruction is sent for replay via a fast replay loop at block 608. At block 622, the instruction is sent to the execution unit for re-execution.

If no error is found at block 606, the instruction proceeds to the slow checker. The slow checker checks for a complete set of errors at block 610. If no error is discovered at block 612, then the instruction is sent at block 614 to retirement and its results applied to the architectural state. But if any error is discovered at block 612, a determination is made at block 616 as to whether the error is of a type having a long latency or requires another type of correction. If the error is determined to not have a long latency or other correction, then the instruction is sent for replay via a slow replay loop at block 618. At block 622, the instruction is sent to the execution unit for re-execution.

If the error is determined to be of a long latency type at block 616, then a determination is made as to what type of error and instruction is present. Based on the type of error and instruction, the replay logic and pick a minimum delay period to hold the instruction before submitting the instruction for replay. This delay is an attempt to wait for the condition causing the error to cure. However, replaying of the instruction is no guarantee that the instruction will now execute correctly. If the error is not corrected during the re-execution, the replay logic of this embodiment can either delay the instruction for another delay period of equal or greater time than the previous replay loop. At block 620, the instruction is sent to a delay queue for delayed replay. The delay queue chosen to temporarily store the instruction is one having the closet matching delay period. At block 622, the instruction is sent to the execution unit for re-execution.

The examples above have been described in the context of a single processor. In a multiprocessor system, the method can be performed concurrently in each processor. Although a replay system having two checkers is disclosed, the replay system of other embodiments can have one or more checker. Each successive checker may detect a larger set of replay conditions, ensuring that an incorrectly executed operation will be detected and replayed. Similarly, the processor may have one ore more replay loops. The processors described can also be multi-channel processors. Each channel can includes all of the components in the pipeline. However, the execution unit for each channel will differ. For example, the execution unit of one channel can be a memory unit. The execution unit for another channel can be an arithmetic unit.

Each channel includes its own replay mechanism. For other embodiments, the processor can be a multi-threaded processor. The slow checker can cause some of the threads to be retired while others are being replayed. Thus an execution unit may be more efficiently used by a number of threads.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A method comprising:

dispatching an instruction for execution;

speculatively executing said instruction;

determining whether said instruction executed correctly;

routing said instruction to a replay mechanism if said instruction did not execute correctly;

determining whether incorrect execution of said instruction is due to a long latency operation;

routing said instruction for re-execution if said incorrect execution is not due to said long latency operation and advancing said instruction forward for replay into an earlier replay time slot if a slot becomes available;

delaying routing of said instruction for re-execution if said incorrect execution is due to said long latency operation and moving said instruction backwards in time as resource conflicts are detected;

re-executing said instruction if said instruction did not execute correctly;

retiring said instruction if said instruction executed correctly;

routing said instruction to a delay queue to wait a period of time before re-executing said instruction if said incorrect execution is due to said long latency operation;

determining what type of error caused said instruction to execute incorrectly;

predicting what length time period to delay said instruction prior to routine said instruction for re-execution if said incorrect execution is due to said long latency operation;

tracking number of times said instruction is executed and re-executed and increasing said time period to delay said instruction for re-execution as number of time said instruction has been executed and re-executed increases.

2. The method of claim 1 wherein said retiring further comprises applying a result of said instruction to an architectural state if said instruction executed correctly.

3. The method of claim 2 further comprising discarding execution result of said instruction if said instruction executed incorrectly.

4. A method comprising:

dispatching an instruction;

speculatively executing said instruction;

checking whether said instruction executing correctly and determining whether a long latency type of error caused said instruction to execute incorrectly if said instruction did not execute correctly;

replaying said instruction if said instruction did not execute correctly, wherein said replaying comprises dynamically determining a time period to delay said instruction prior to re-execution i. And shifting said instruction forward in a delay queue for earlier replay if a time slot becomes available and shifting said instruction backwards in said delay queue for later replay if a resource conflict is detected;

re-executing said instruction after said time period elapsed if said instruction did not execute correctly; and retiring said instruction if said instruction executed correctly;

ii. routing said instruction to said delay queue to wait for said time period to elapse prior to re-executing said instruction if said long latency type of error caused said instruction to execute incorrectly;

routine said instruction from said delay queue for re-execution after said time period has elapsed; and tracking the number of times said instruction is executed and re-executed, wherein said time period to delay said instruction for re-execution is increased as the number of times said instruction has been executed and re-executed increases.

5. The method of claim 4 wherein said routing of said instruction from said delay queue comprises rescheduling said instruction for re-execution.

6. The method of claim 4 wherein said routing of said instruction from said delay queue comprises sending said instruction for re-execution without rescheduling said instruction.

7. The method of claim 4 wherein said retiring further comprises applying a result of said instruction to an architectural state if said instruction executed correctly.

8. A processor comprising:

a scheduler to dispatch instructions;

a multiplexor coupled to said scheduler, said multiplexor to receive said instructions from said scheduler;

an execution unit coupled to said multiplexor, said execution unit to execute said instructions;

a checker coupled to said execution unit, said checker to determine whether each instruction has executed correctly; and a replay mechanism coupled to said checker, said replay mechanism to receive from said checker cach instruction that has not executed correctly, said replay mechanism further comprising logic to determine whether a long latency operation caused an incorrectly executed instruction, said logic also to dynamically determine a time period to delay said incorrectly executed instruction if said long latency operation caused said incorrectly executed instruction and wherein said logic increases said time period to delay said incorrectly executed instruction as number of times increases.

9. The processor of claim 8 wherein said replay mechanism further comprises a delay queue to store said incorrectly executed instruction for said time period prior to releasing said incorrectly executed instruction to said execution unit for re-execution.

10. The processor of claim 9 wherein said replay mechanism further comprises a counter to count a number of times said incorrectly executed instruction is executed and re-executed.

11. The processor of claim 8 further comprising:

a retirement unit coupled to said checker to receive any instructions that have executed correctly, said retirement unit to retire said instructions that have executed correctly;

a first level internal cache coupled to said execution unit; and a second level internal cache coupled to said execution unit, wherein access time to said second level internal cache is greater than to said first level cache.

12. The processor of claim 11 wherein said processor is coupled to an external main memory and to a disk memory.

13. The processor of claim 12 wherein said incorrectly executed instruction is a memory load operation, said memory load instruction operation to cause a memory fetch, said memory fetch to search through a memory hierarchy for requested data, wherein said memory hierarchy is comprised of said first level cache, said second level cache, said external main memory and said disk memory, and wherein said first level cache has the fastest access time and said disk memory has the longest access time.

14. The processor of claim 13 wherein each incorrect execution of said memory load instruction causes said memory fetch to access a slower level of memory, and said logic increases said time delay to approximate an access latency to said slower level of memory.

* * * * *